US011989982B1

(12) United States Patent  
Monaghan et al.

(10) Patent No.: US 11,989,982 B1
(45) Date of Patent: May 21, 2024

(54) SYSTEMS AND METHODS FOR VEHICLE TUNING AND CALIBRATION

(71) Applicant: MONLIZ LLC, Sacramento, CA (US)

(72) Inventors: Robert Monaghan, Ventura, CA (US); Lee Lizarraga, Ventura, CA (US)

(73) Assignee: MONLIZ LLC, Sacramento, CA (US)

( * ) Notice: Subject to any disclaimer, the term of this patent is extended or adjusted under 35 U.S.C. 154(b) by 0 days.

(21) Appl. No.: 18/456,725

(22) Filed: Aug. 28, 2023

(51) Int. Cl.
G07C 5/08 (2006.01)
G07C 5/00 (2006.01)

(52) U.S. Cl.
CPC ........... *G07C 5/0808* (2013.01); *G07C 5/006* (2013.01); *G07C 5/0825* (2013.01)

(58) Field of Classification Search
None
See application file for complete search history.

(56) References Cited

U.S. PATENT DOCUMENTS

| | | | | |
|---|---|---|---|---|
| 5,208,646 A * | 5/1993 | Rogers | ................... | G01B 5/255 |
| | | | | 356/139.09 |
| 2003/0061719 A1* | 4/2003 | Gerdes | ................ | G01M 17/022 |
| | | | | 33/203.13 |
| 2006/0112573 A1* | 6/2006 | Hillman | ................ | G01B 11/275 |
| | | | | 33/203 |
| 2018/0053320 A1* | 2/2018 | Kunert | ................... | G06T 7/60 |
| 2018/0075222 A1* | 3/2018 | Chen | ................... | A61B 5/0015 |
| 2019/0187241 A1* | 6/2019 | Jaeger | ................... | G01S 5/0063 |
| 2021/0387637 A1* | 12/2021 | Rogers | ................... | H04W 4/48 |
| 2022/0136824 A1* | 5/2022 | Arruda | ................ | G01B 11/275 |
| | | | | 356/139.09 |
| 2022/0412730 A1* | 12/2022 | Mambrilla | ........... | G01B 11/275 |
| 2023/0271464 A1* | 8/2023 | Wen | ................... | B60C 25/0548 |
| | | | | 157/11 |

* cited by examiner

*Primary Examiner* — James J Lee
*Assistant Examiner* — Wenyuan Yang
(74) *Attorney, Agent, or Firm* — Ansari Katiraei LLP; Arman Katiraei; Sadiq Ansari

(57) ABSTRACT

Disclosed is a vehicle tuning and calibration system and associated methods for diagnosing and correcting issues involving vehicle performance, driving characteristics, and/or driver assist features. The system includes multiple sensor packages with connectors for mounting a different sensor package to a different wheel of a vehicle. Each sensor package includes sensors that generate measurements for a positioning and movements of the wheel onto which that sensor package is mounted. The system also includes a controller that receives the measurements generated by the sensor packages mounted to the different wheels of the vehicle. The controller generates a user interface with visual representations that are derived from the measurements. The visual representations may identify toe, camber, caster, and other alignment issues detected for different wheels, adjustments to correct the detected issues, and positions and orientations at which to place targets relative to the vehicle for vehicle sensor calibration.

20 Claims, 11 Drawing Sheets

SYSTEMS AND METHODS FOR VEHICLE TUNING AND CALIBRATION

BACKGROUND

Some vehicle adjustments or repairs may be made imprecisely because they are performed and verified manually without exact measurements or diagnostic tools. For instance, vehicle wheel alignment may be performed relative to an estimated central position of the steering wheel and visual or manual verification that the wheels are aligned.

Other repairs may be performed with greater precision albeit at greater expense using customized tools and/or hardware that may be still be subject to user error. For instance, many vehicles have driver assist features that use sensors to keep the vehicle within a lane, apply braking for collision avoidance, and/or otherwise perform automated steering, acceleration, and deceleration. Proper sensor calibration requires the repair facility to have level surfaces, invest in expensive and large Advanced Driver Assistance Systems ("ADAS") equipment, and/or specialized ADAS equipment for calibrating systems of different vehicle manufacturers. Proper sensor calibration is necessary to ensure correct operation of the driver assist features. Although the calibration is mostly performed without human involvement, humans are required to place and orient the targets against which the calibration is performed. The manufacturer specifies the distance and orientation for each target, and it is up to the human to adhere exactly to the manufacturer specifications. Improper placement of the targets may lead to improper calibration or failed calibration of the driver assist features.

DETAILED DESCRIPTION OF PREFERRED EMBODIMENTS

Figure 1:
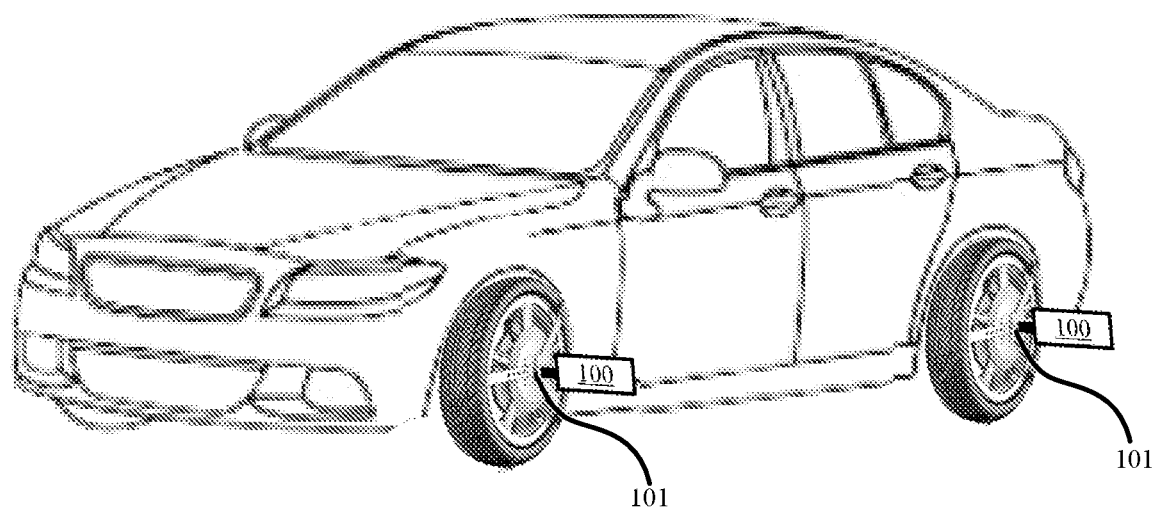
FIG. 1 illustrates an example of different sensor packages being mounted to two or more wheels of a vehicle for the assisted tuning or calibration of the vehicle in accordance with some embodiments presented herein.

The following detailed description refers to the accompanying drawings. The same reference numbers in different drawings may identify the same or similar elements.

Provided are systems and methods for vehicle tuning and calibration. The systems and methods include sensor packages that are mounted to two or more vehicle wheels, and a controller that is communicably coupled to and/or integrates with the sensor packages in order to precisely diagnose and correct issues involving vehicle performance, driving characteristics, and/or driver assist features.

The sensor packages perform various measurements related to the movement, positioning, and/or rotation of the vehicle wheels. The controller receives and analyzes the sensor package measurements independently and relative to one another in order to detect vehicle hardware and/or software that operate outside of manufacturer specifications and/or tolerances. For instance, the controller may use the sensor package measurements to detect structural damage to the vehicle frame, axles, and body, to detect wheel misalignment, and other issues affecting the vehicle performance and/or driving characteristics. In addition to the issue detection, the controller uses the sensor package measurements to provide exact adjustments for correcting the detected issues. The controller also uses the sensor package measurements for proper calibration of the vehicle sensors. For instance, the controller generates a user interface that uses the sensor package measurements to identify the manufacturer specified positions and orientations for different targets that the vehicle's sensor calibration systems use to calibrate and ensure correct operation of the vehicle's driver assist features. Improper placement of the targets due to imprecise manual measurements or user estimation of the target positions and orientations may cause the vehicle sensor to be improperly calibrated and may cause lane keeping, adaptive cruise control, and other driver assist features that perform automated steering, acceleration, and deceleration to malfunction or operate incorrectly.

In some embodiments, the controller generates the user interface with augmented reality ("AR"), mixed reality ("MR"), virtual reality ("VR"), or other enhanced displays for tuning and/or calibrating the vehicle hardware and/or software back to manufacturer specifications and/or tolerances. For instance, the controller may generate an AR display for identifying wheels that are out of alignment, visually depicting the misalignment, and presenting specific adjustments to one or more of the camber, toe, caster, or other wheel parameters that align the wheels according to manufacturer specifications and/or tolerances. For driver assist feature calibration (e.g., Advanced Driver Assistance Systems ("ADAS") calibration), the controller may generate a user interface that presents images of the vehicle and the surrounding space, and may overlay the images with markers or visual points-of-reference for where the calibration targets are to be positioned and how the calibration targets are to be oriented to ensure proper calibration. The controller identifies the positioning and orientation for the targets based on the measured positions of two or more of the sensor packages that are mounted to two or more of the vehicle wheels, and positional and orientation deltas between the positioning of the sensor packages and the manufactured specified positions and orientations for the targets. The positions and orientations identified in the user interface are precise to within a few millimeters. Moreover, the sensor packages and the controller may verify the user placement of the calibration targets based on signaling emitted from the calibration targets and/or measurements of the calibration targets obtained from the sensor packages and/or the controller. Consequently, the sensor packages and the controller provide a vehicle tuning and calibration system that eliminates user error from vehicle diagnostics, tuning, adjustment, repair, and/or calibration.

FIG. 1 illustrates an example of sensor packages 100 being mounted to two or more wheels for the assisted tuning or calibration of the vehicle in accordance with some embodiments presented herein. Each sensor package 100 is mounted to a wheel with wheel clamp 101.

Wheel clamp 101 aligns sensor package 100 about a center of the wheel while positioning sensor package 100 some distance away from the wheel. In some embodiments, sensor package 100 is suspended parallel to the center of the wheel and 6-36 inches laterally off the wheel center. The distance between sensor package 100 and the center of the wheel allows sensor package 100 to more precisely measure the wheel rotation.

Wheel clamp 101 includes a set of rods. Each rod in the set of rods has a distal end with a clamp or connector that attaches onto the wheel or to a point on the rim, and a proximal end that extends some distance away from the wheel to a height that is aligned with the wheel center. A mounting bracket is attached to the proximal end of the set of rods. Sensor package 100 may be mounted or attached to the mounting bracket. In some embodiments, wheel clamp 101 centers sensor package 100 relative to the center of the wheel. Specifically, the length of all rods are adjusted collectively to ensure that sensor package 100 is aligned with a center of the wheel.

Figure 2:
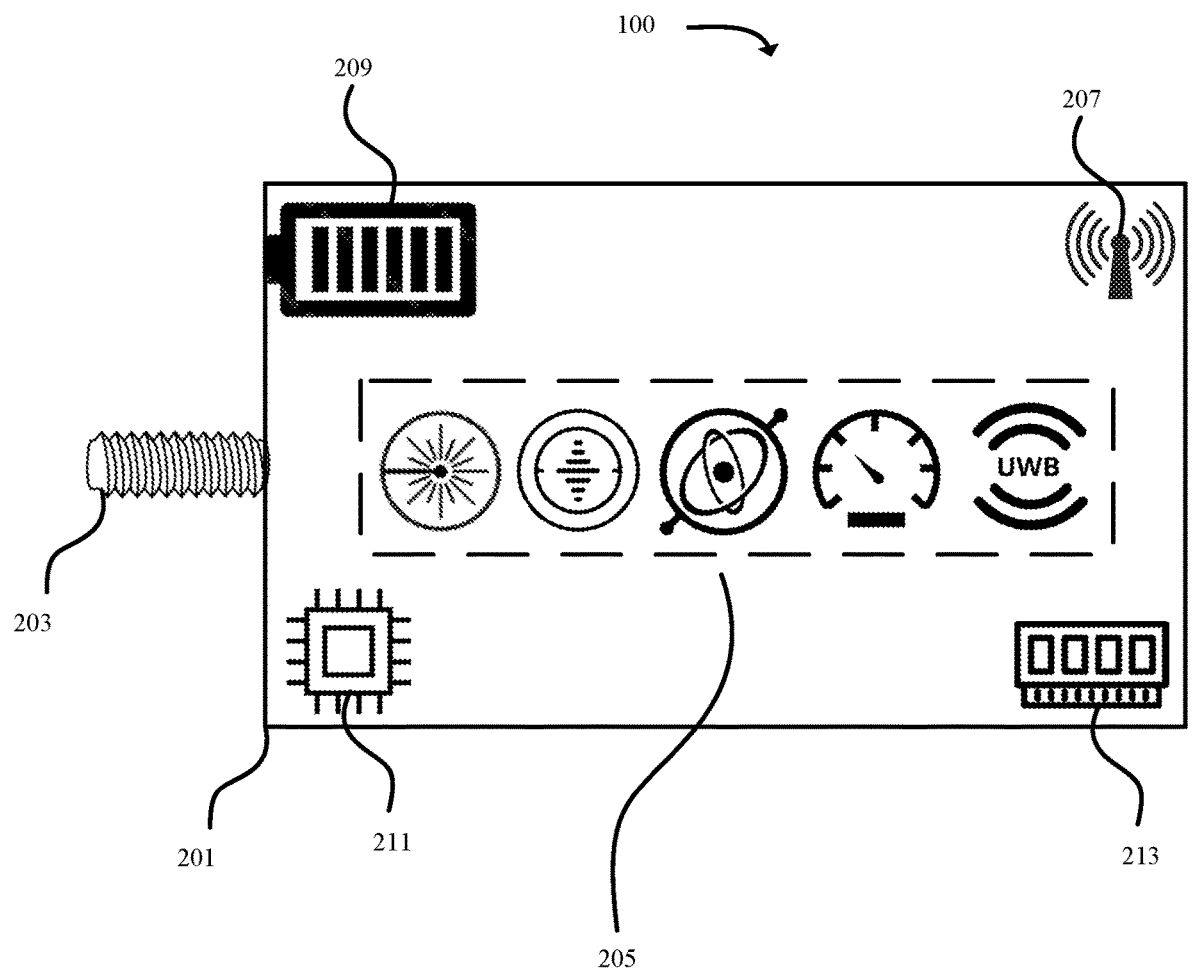
FIG. 2 illustrates example components of a sensor package in accordance with some embodiments presented herein.

FIG. 2 illustrates example components of sensor package 100 in accordance with some embodiments presented herein. Sensor package 100 includes housing 201, mounting bracket connector 203, sensory array 205, wireless transceiver 207, power module 209, one or more processors 211, and volatile and/or non-volatile storage 213. In some embodiments, sensor package 100 may include more or less components, and may incorporate the components so that the weight is equally distributed across sensor package 100. For instance, sensor package 100 may include a haptic feedback module, lights, or speakers to provide different status or feedback to the user. The haptic feedback module, lights, or speakers may indicate when sensor package 100 is synched or connected to a controller 100, when it is activated and measuring data, and/or when specific tests or diagnostics have been completed.

Housing 201 protects the components within housing 201 from environmental contaminants. For instance, sensor package 100 is often used within a mechanic shop and will therefore be exposed to grease, grime, oil, vehicle fluids, and the like. Housing 201 may be formed from a plastic or other rigid material that protects the internal components without interfering with the signaling of sensory array 205. Accordingly, housing 201 does not distort the measurements obtained by sensory array 205.

Mounting bracket connector 203 connects sensor package 100 to the mounting bracket of wheel clamp 101. Mounting bracket connector 203 may include a threaded extension that protrudes from the center of one side of sensor package 100 and that screws into a threaded socket of the mounting bracket, or may include a threaded socket that screws into a threaded extension protruding from the center of the wheel clamp mounting bracket. In some embodiments, mounting bracket connector 203 may use other mounting hardware to connect to the mounting bracket of wheel clamp 101. For instance, mounting bracket connector 203 may connect to the mounting bracket via magnets, Velcro, nuts and bolts, hooks and grooves, clamp-down socket joints, and/or other types of fasteners.

Sensory array 205 includes multiple sensors for measuring distance, height, acceleration, angular velocity, rotation, and/or other properties related to the placement and movement of the wheel. Sensory array 205 may include one or more of an Ultra-WideBand ("UWB") chip, range finding sensor, accelerometer, inertial measurement unit ("IMU"), gyroscope, and/or other sensors. In some embodiments, sensory array 205 may include more or less sensors depending on the diagnostics, measurements, and adjustments that sensor package 100 is configured to provide.

The UWB chip of a first sensor package 100 that is mounted to a first vehicle wheel may communicate with the UWB chip of a second sensor package 100 that is mounted to a second vehicle wheel in order to precisely measure the distance and positional offset between the two wheels. The UWB chips may also be used to identify a desired position and orientation for a calibration target relative to the wheel positions. The UWB chip of a sensor package 100 may also communicate with a UWB chip on the calibration target to verify that the actual position and orientation of the calibration target matches the desired position and orientation or that the target is a specified distance, height, and angle away from that sensor package 100.

Range finding sensor may include an acoustic range finder that uses sound waves to measure the height of sensor package 100 off the ground and/or the distance to other objects. Range finder sensor may also include a time-of-flight sensor, Light Detection and Ranging ("LiDAR"), or other sensor for measuring the height of sensor package 100 or distances between sensor package 100 and other objects.

Accelerometer, IMU, gyroscope, and other sensors of sensory array 205 may measure the rotation, tilt, movement, and/or other characteristics of the vehicle wheel. The controller may use these measurements to determine if the vehicle chassis is damaged or bent, if the wheels are aligned or require adjustment, and/or if other driving characteristics of the vehicle are affected and require tuning or adjustment.

Wireless transceiver 207 transmits measurements generated by sensory array 205 to the controller. Additionally, wireless transceiver 207 receives commands from the controller. The commands may include activating specific sensors of sensory array 205 and/or performing different measurements, tests, or verifications with sensory array 205.

In some embodiments, power module 209 may include the battery that powers operation of sensor package 100. In some such embodiments, housing 201 may include a port for connecting the battery to a power supply and for charging the battery. Alternatively, power module 209 may use inductive charging to charge the internal battery.

To reduce the weight of sensor package 100, some embodiments exclude the battery from power module 209. In some such embodiments, power module 209 receives power from an external battery or power supply, and distributes the power via wires to sensory array 205, wireless transceiver 207, processors 211, and/or other electronic components of sensor package 100. For instance, the battery may be located on the wheel clamp with wiring running along one of the rods to power module 209.

Processors 211 may convert measurements produced by sensory array 205 into measurements that affect wheel alignment, sensor calibration, and/or other vehicle hardware and/or software tuning. Processor 211 may also execute commands received from the controller via wireless transceiver 207. Processor 211 may also timestamp the measurements that are generated by the different sensors of sensory array 205 based on a configurable clock that may be controlled by processor 211. The controller may synchronize the clocks across different sensor packages 100 upon connecting to, pairing with, or otherwise receiving the sensor data or measurements from the different sensor packages 100. Accordingly, measurements generated by different synchronized sensor packages 100 at the same point in time may associate the same timestamp to those measurements such that the controller may compare measurements that are generated by different sensor packages 100 at the same time, and may detect issues or derive metrics based on the synchronized measurements.

Volatile and/or non-volatile storage 213 may store the measurements that are generated by sensory array 205, diagnostic values derived from the measurements by processors 211, and/or firmware or instructions that control operation of sensor package 100.

The controller may wirelessly connect to sensor packages 100 that are mounted on each wheel of a particular vehicle. The controller may perform a pairing or discovery procedure to connect to sensor packages 100. A light or other indicator on sensor packages 100 may indicate when pairing is successful and the controller is able to wirelessly communicate with sensor packages 100.

Once connected to one or more sensor packages 100, the controller may aggregate the sensor data from the connected sensor packages 100, may convert the sensor data into measures related the vehicle performance and/or driving performance, may detect various issues affecting the vehicle performance and/or driving performance, and may generate the user interface that guides users in tuning, repairing, or otherwise adjusting the detected issues and/or in correctly calibrating driver assist features and other hardware and/or software of the particular vehicle.

The vehicle tuning and calibration system is implemented based on the coordinated operation of the controller and sensor packages 100. The controller may be specialized software that is executed on a user device with a display, one or more processors, memory, storage, network, and/or other hardware resources. In some embodiments, the controller executes on a smartphone, tablet, laptop computer, desktop computer, AR/MR/VR headset or device, and/or other such devices.

The controller and sensor packages 100 of the vehicle tuning and calibration system may be used to diagnose, detect, and correct issues with the drive characteristics of the vehicle. For instance, the controller may derive tire pressure readings from the height measurements generated by sensory array 205. Specifically, the controller may model the different heights that are measured by sensor package 100 when mounted to tires of different manufacturers with different tire pressures. The tire make and model and manually measured pressures may be initially programmed or entered into a database that the controller references. Accordingly, the controller may convert subsequent height measurements to tire pressure readings when the controller is configured with the make and model of the mounted tires or the make and model of the vehicle that is associated with specific makes and models of tires. Other drive characteristics that the vehicle tuning and calibration system may diagnose, detect, and/or correct include structural damage to the vehicle frame, axles, and/or other drive components, worn shocks, struts, and/or drive components, and misalignment of the wheels.

Figure 3:
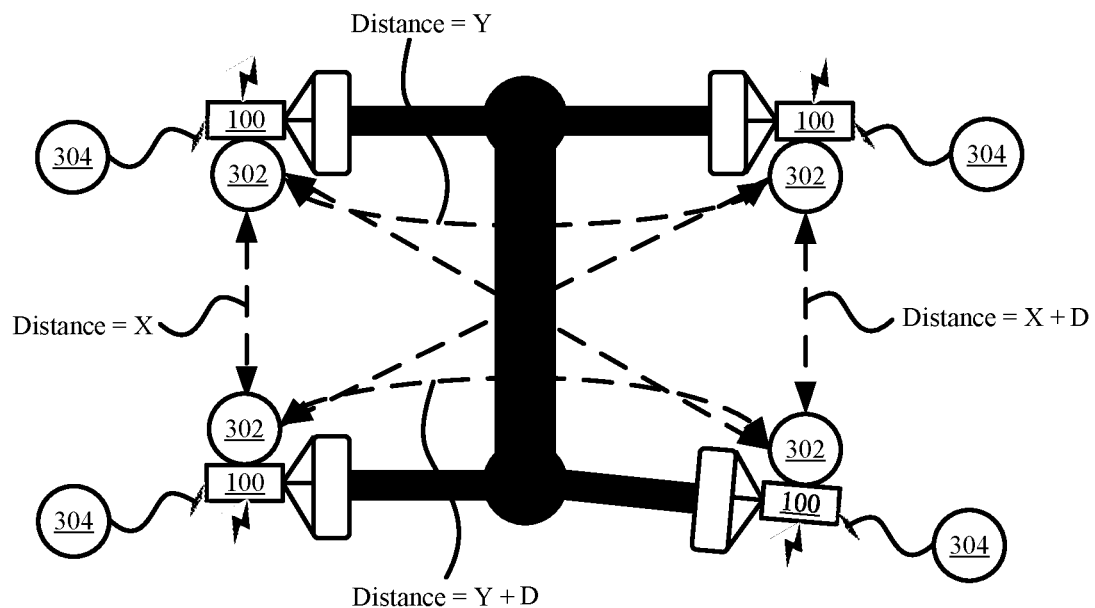
FIG. 3 illustrates an example of using the sensor package and a controller of a vehicle tuning and calibration system to detect issues affecting the driving characteristics of a vehicle in accordance with some embodiments.
Figure 3:
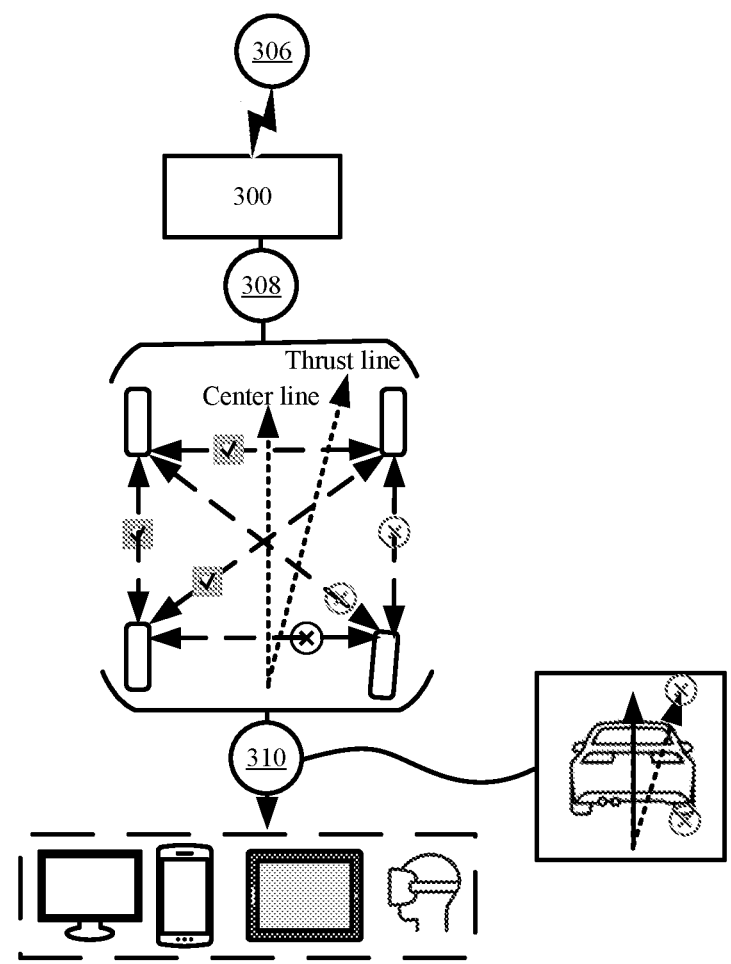

FIG. 3 illustrates an example of using sensor package 100 and controller 300 of the vehicle tuning and calibration system to detect issues affecting the driving characteristics of a vehicle in accordance with some embodiments. As shown in FIG. 3, a sensor package 100 is mounted to each of the four vehicle wheels.

Each sensor package 100 uses UWB signaling to detect (at 302) the exact position of that sensor package 100 in three-dimensional ("3D") space and/or its position relative to all other sensor packages 100. Additionally, the range finder sensor(s) of each sensor package 100 may measure (at 304) the distance or height of that sensor package 100 off the floor to account for any skew or deviation in the sensor package 100 positioning due to uneven surfaces.

Controller 300 receives (at 306) the measurements from each sensor package 100 via wireless signaling transmitted from sensor packages 100 to controller 300. Sensor packages 100 may be configured to send the measurements to controller 300 as they are generated or at time intervals. Alternatively, controller 300 may request the measurements from sensor packages 100 at a specific frequency or sampling rate.

Controller 300 analyzes (at 308) the received (at 306) measurements for damage to the vehicle axles, structure, and/or other hardware components for attaching the wheels to the vehicle frame. Analyzing (at 308) the received (at 308) measurements may include comparing the received (at 306) measurements to one another in order to determine whether the front and rear wheels on either side of the vehicle are separated by the same distance, whether the front wheels are parallel to one another, whether the rear wheels are parallel to one another, whether distances between the wheels are within manufacturer specifications or tolerances, and/or whether the wheel positions are at manufactured defined positions. Controller 300 may determine that all measurements involving the rear right wheel deviate from manufacturer defined positions and/or positions of other wheels. Accordingly, controller 300 may determine that the rear right axle is damaged.

In some embodiments, controller 300 determines the thrust line or thrust angle of the vehicle from the received (at 308) measurements, and further determines whether the thrust line matches the vehicle center line. If the positions measured by sensor packages 100 on the rear wheels are parallel to one another (e.g., sensor packages 100 on the rear wheels are positioned perpendicularly to the vehicle center line), then controller 300 determines that the thrust line and center line of the vehicle match and that there is no structural damage to the axles and/or frame that would prevent tuning of other vehicle characteristics such as the wheel alignment. The thrust line and/or positioning of all sensor packages 100 may also be used to confirm that the rear axle is parallel to the front axle and that the wheelbase on both sides of the vehicle are the same. As shown in FIG. 3, controller 300 determines that the thrust line is offset from the vehicle center line, and that there may be structural damage to the vehicle as a result.

Controller 300 generates (at 310) a user interface that presents the measured wheel positions and/or the detected vehicle thrust line in relation to the vehicle center line. In some embodiments, controller 300 generates (at 310) the user interface as an augmented reality view that overlays the computed thrust line relative to a captured image of vehicle. Specifically, controller 300 performs image analysis to identify the positioning of the vehicle in the captured images, identify the center line of the vehicle based on the image analysis, and overlay the computed thrust line relative to the center line. In some other embodiments, controller 300 generates (at 310) the user interface with an outline or representation of the vehicle and the thrust line presented relative to the vehicle outline or representation.

Controller 300 may generate (at 310) the user interface with additional data. For instance, controller 300 may change the color of the thrust line to indicate whether the thrust line matches the center line and/or is within allowable tolerances. If the thrust line is determined to be offset from the vehicle center line by more than a threshold angle or distance, controller 300 may update the user interface to identify the one or more components (e.g., axle, wheel, etc.) that were measured with anomalous values (e.g., measurements that deviate from manufacturer tolerances and/or specifications) and that are likely causing the deviation of that thrust line from the center line. The user interface may visually assist the user in identifying where the vehicle damage may exist and/or where repairs are needed. For instance, the generated (at 310) user interface identifies the right rear wheel being misaligned or offset from the vehicle center line. The user may then inspect the right rear axle and/or other structural components attaching the right rear wheel to the vehicle for damage.

Sensor package 100 and controller 300 may be used to detect, diagnose, tune, repair, and/or otherwise correct other issues affecting the vehicle driving characteristics. In some embodiments, verifying that the thrust line matches the center line is a first diagnostic in a series of diagnostics related to evaluating and tuning the vehicle driving characteristics. For instance, establishing that the thrust line matches the center line is a first diagnostic for proper wheel alignment and/or for calibrating the sensors that are used for autonomous driving and/or other driver assist features (e.g., lane keeping, adaptive cruise control, emergency braking, etc.).

Figure 4:
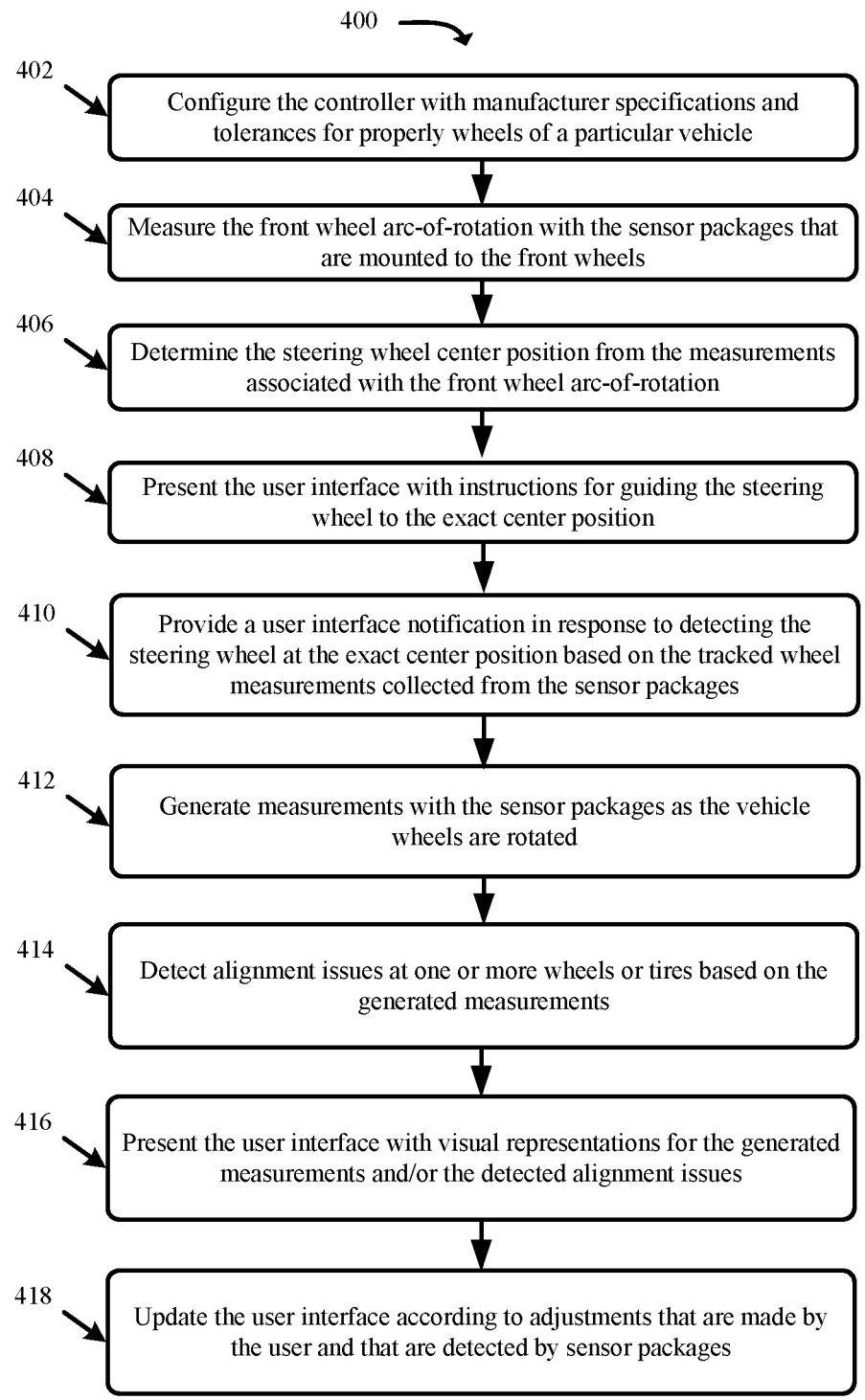
FIG. 4 presents a process for performing wheel alignment using the sensor packages and the controller of the vehicle tuning and calibration system in accordance with some embodiments presented herein.

FIG. 4 presents a process 400 for performing wheel alignment using sensor packages 100 and controller 300 of the vehicle tuning and calibration system in accordance with some embodiments presented herein. In some embodiments, process 400 is implemented after mounting sensor packages 100 on each wheel of a vehicle, pairing sensor packages 100 to controller 300, and/or completing an earlier diagnostic that verifies the thrust line matches the vehicle center line.

Process 400 includes configuring (at 402) controller 300 with manufacturer specifications and tolerances for properly wheels of a particular vehicle. Configuring (at 402) controller 300 may include entering the make and model of the vehicle, the vehicle identification number ("VIN"), license plate, and/or other identifying information about the vehicle into the user interface of controller 300. In some embodiments, the vehicle identifying information may be scanned or captured using a camera of controller 300. For instance, controller 300 may activate a camera on the user device, and the camera may be used to scan or capture an image of the VIN or license plate. Controller 300 searches a vehicle database using the received vehicle identifying information. The vehicle database stores and returns the manufacturer defined wheel alignment tolerances and specifications for the identified vehicle. For instance, different vehicle makes and models may be aligned using different amounts of toe, camber, caster, and/or different values for other adjustable wheel parameters.

Process 400 includes measuring (at 404) the front wheel arc-of-rotation with sensor packages 100 that are mounted to the front wheels. Measuring (at 404) the front wheel arc-of-rotation includes turning the steering wheel fully in a first direction (e.g., left), obtaining wheel rotation, angle, range of motion, and/or positional measurements during the wheel rotation to the first direction and/or at the end position of the first direction from sensor packages 100, turning the steering wheel fully in an opposite second direction (e.g., right), and obtaining wheel rotation, angle, range of motion, and/or positional measurements to the second direction from sensor packages 100. Accordingly, measuring (at 404) the front wheel arc-of-rotation includes determining the range-of-motion at the vehicle front wheels.

Process 400 includes determining (at 406) the steering wheel center position from the measurements associated with the front wheel arc-of-rotation. Specifically, controller 300 receives the measurements from the front wheel sensor packages 100, determines the exact position for the furthest rotation of the front wheels to the right and to the left, and determines (at 406) the steering wheel center position as the median or mean position between the furthest rotation of the front wheels to the right and to the left.

Process 400 includes presenting (at 408) the user interface with instructions for guiding the steering wheel to the exact center position. Controller 300 continually receives positional measurements from sensor packages 100 mounted on the front wheels, determines a difference between the measured current front wheel position and the computed center position, and provides visual or audible queues in the user interface or haptic feedback that the user references to adjust the steering wheel to the exact center position. For instance, the interface may provide instructions that guide the user in turning the steering wheel right or left until the front wheel are measured at the exact center position, and the user device may provide haptic feedback (e.g., vibrate) to indicate when the center position is reached. Typical wheel alignment is imprecise because it involves the user manually or visually guessing when the center position is reached. However, the vehicle tuning and calibration system uses the precise measurements from sensor package 100 to remove the guesswork and ensure accurate and precise wheel alignment.

Process 400 includes providing (at 410) a user interface notification in response to detecting the steering wheel at the exact center position based on the tracked wheel measurements collected from sensor packages 100. Providing (at 410) the notification may include changing a visual representation (e.g., colors) of the user interface once the steering wheel is perfectly centered, providing haptic feedback with actuators of the user device, and/or presenting graphical elements or sounds that indicate when the steering wheel is perfectly centered. The user may then lock the steering wheel at the exact center position to continue with the next steps of the guided wheel alignment. It should be noted that the exact center position of the steering wheel may not always coincide with the position of the front wheels being parallel with the vehicle center line especially when the front wheels are not perfectly aligned or when the alignment specified by the manufacturer includes some positive or negative toe, camber, or caster for the wheels that tilt or otherwise skew the wheels from being parallel to the center line.

Process 400 includes generating (at 412) measurements with sensor packages 100 as the vehicle wheels are rotated.

In some embodiments, controller 300 instructs the user to move the vehicle forward and/or backward by some amount with the steering wheel locked in the central position in order for sensor packages 100 to generate (at 412) the measurements. In some embodiments, sensor packages 100 generate sufficient measurements with the wheels moving and/or rotating forward and backward by as little as 10-20 centimeters which corresponds to the wheels rotating between 30-60 degrees. Since the wheel clamps extend each sensor package 100 some distance away from the center of each wheel, the angles, orientations, heights, and/or other measurements obtained by sensory array 205 for each wheel become more exaggerated and easier to measure.

In some embodiments, sensor packages 100 generate (at 412) measurements for the toe, camber, caster, and/or other adjustable parameters of each wheel. The toe measurements may include measurements for the angle with which the wheel or tire rotates relative to the vehicle center line or the angle with which the front wheels or rear wheels rotate relative to one another. A negative toe indicates that the wheels are positioned or directed at an angle that is pointed away or outwards from the vehicle center line and/or away from one another, and a positive toe indicates that the wheels are positioned or directed at an angle inwards, towards the vehicle center line, and/or towards one another. The camber measurements include measurements for the tilt of the wheels or tires relative to a fully upright or straight orientation. The camber measurements may include measurements for the height of sensor packages 100 as the wheel rotates, and determining if the height remains the same (e.g., zero camber), changes with a sensor indicating sensor package 100 is elevated or angled up relative to the wheel center (e.g., negative camber), or changes with a sensor indicating sensor package 100 is lowered or angled down relative to the wheel center (e.g., positive camber) during the wheel rotation. The camber measurements indicate whether the tires are riding on the inside or outside of the tires. The caster measurements include measurements for the angle of the steering axis. Measuring the caster may require additional rotations of the wheel vehicles that start from a non-centered steering wheel position and measuring the rate at which the wheels return to center.

Figure 5:
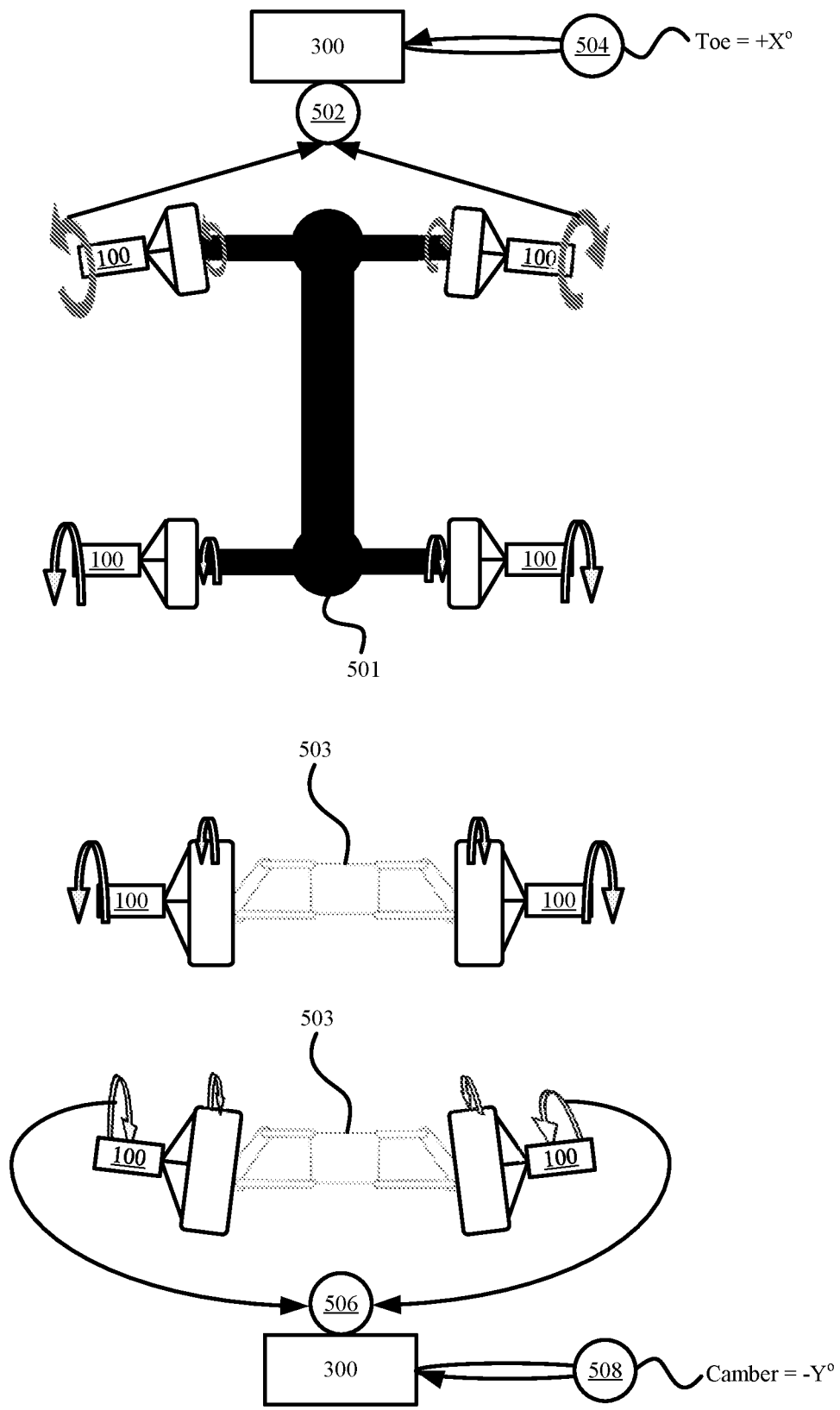
FIG. 5 illustrates an example of the exaggerated wheel rotations that are measured by the sensor packages in accordance with some embodiments presented herein.

FIG. 5 illustrates an example of the exaggerated wheel rotations that are measured by sensor packages 100 in accordance with some embodiments presented herein. As shown in FIG. 5, the current alignment and/or position of the front wheels as seen from top view 501 cause the front wheels to rotate or be angled outwards away from the center line of the vehicle (e.g., positive toe), and the current alignment and/or position of the rear wheels as seen from front and rear views 503 cause the rear wheels to rotate with an inward tilt (e.g., negative camber).

The extension of sensor packages 100 away from the center of each wheel causes the effects of these alignment factors to become more pronounced and easier to measure using sensory array 205 of sensor packages 100. For instance, sensor packages 100 mounted to the front wheels measure that the positions of the front wheels are angled away from each other and that the arc-of-rotation of the front wheels are not parallel to each other and are directed away at an obtuse angle relative to one another. Controller 300 receives (at 502) the measurements, and determines and precisely measures (at 504) the amount of positive toe at the front wheels. Similarly, sensor packages 100 mounted to all wheels measure that sensor packages 100 at the rear wheels are closer to the ground and/or angled towards the ground relative to sensor packages 100 at the front wheels, and that sensor packages 100 at the rear wheels rotate with an upward tilt and/or a larger arc-of-rotation relative to sensor packages 100 at the front wheels. Controller 300 receives (at 506) the measurements, and determines and precisely measures (at 508) the amount of negative camber at the rear wheels.

Figure 6:
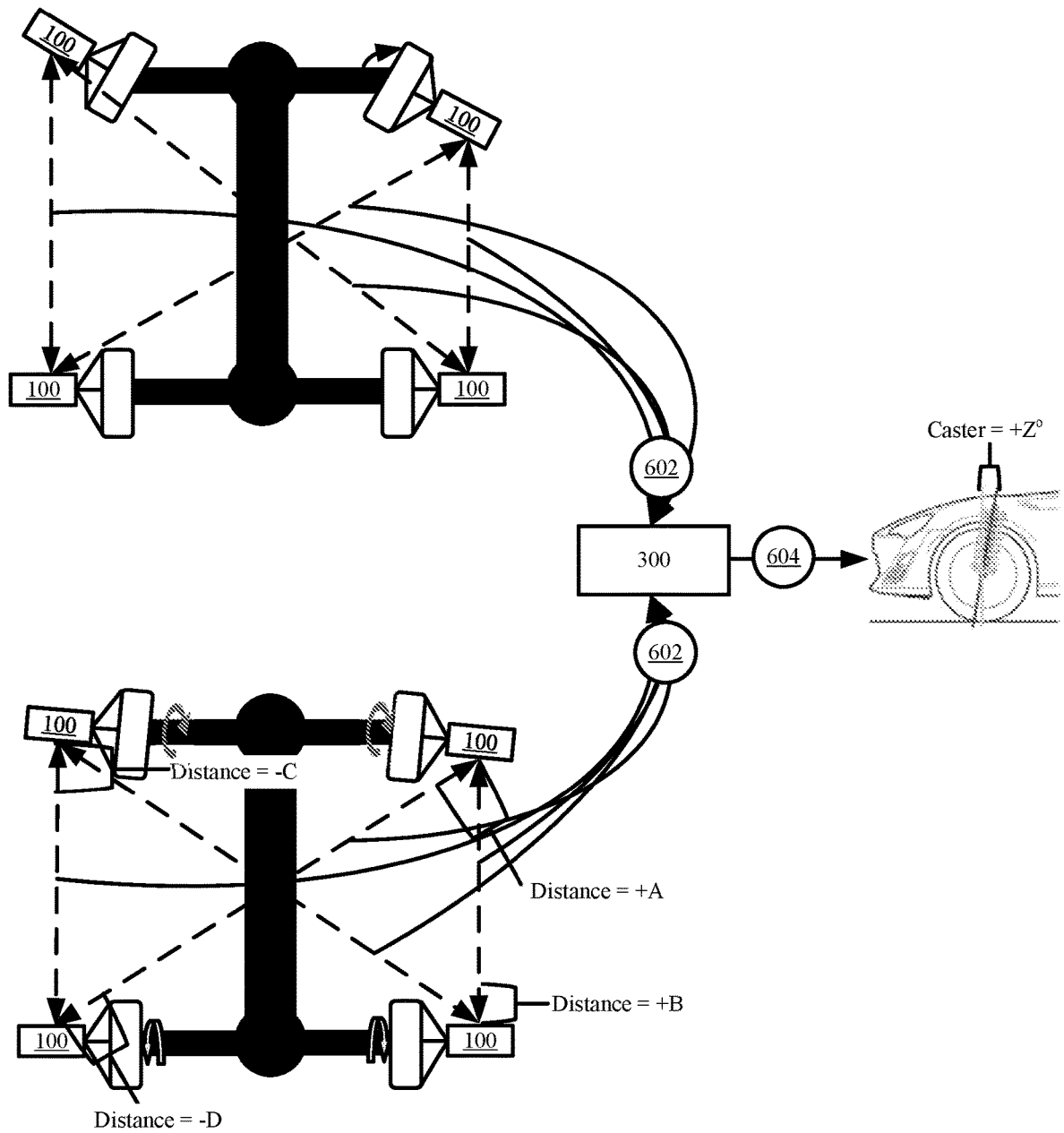
FIG. 6 illustrates an example for measuring the caster angle of the front wheels using the sensor packages in accordance with some embodiments presented herein.

FIG. 6 illustrates an example for measuring the caster angle of the front wheels using sensor packages 100 in accordance with some embodiments presented herein. To measure the caster angle, the steering wheel is moved off the center position to one side. The vehicle is then moved forward, and sensor packages 100 measure the self-aligning torque or the rate at which the wheels return to the center position.

Positive caster refers to the forward positioning of the front wheels relative to the upper ball joint or strut mount. Increased forward positioning creates additional tension or torque that returns the front wheels to the center position more quickly or with fewer rotations of the wheels. If the wheels remain in the turned position after one or more rotations, then there is no self-alignment torque and the wheels which may be caused by the wheels having zero or neutral caster and being vertically aligned with the strut mount or upper ball joint.

Sensor packages 100 may measure (at 602) the change in the angle and/or position of the front wheels relative to the angle and/or position of the rear wheels for every wheel rotation or unit of forward movement. Sensor packages 100 may also use the IMU, accelerometers, gyroscopes, or other sensors to measure the rate at which or the amount by which the front wheels return to the center position with every rotation of the wheels. Controller 300 derives (at 604) the caster angle based on the measured rate, and may compare the derived (at 604) caster angle to the manufacturer defined caster angle for the front wheels in order to determine if the wheels have proper caster alignment.

With reference back to FIG. 4, process 400 includes detecting (at 414) alignment issues at one or more wheels or tires based on the generated (at 412) measurements. In some embodiments, controller 300 detects (at 414) the alignment issues by comparing the generated (at 412) measurements relative to one another and detecting deviations in the generated (at 412) measurements at one or more wheels. In some embodiments, controller 300 detects (at 414) the alignment issues based on the generated (at 412) measurements differing from the configured (at 402) manufacturer tolerances and/or specifications for one or more wheel alignment settings. For instance, controller 300 detects (at 414) toe misalignment based on the positions and/or angles of sensor packages 100 relative to one another, and/or the arc-of-rotation measured at two adjacent wheels not being parallel, detects (at 414) camber misalignment in response to the arc-of-rotation and/or the height of the rotational arc off the ground surface measured by a particular sensor package 100 being greater than or less than the camber angle specified by the manufacturer, and detects (at 414) caster misalignment in response to sensor packages 100 measuring the wheels self-aligning or returning to center at a rate that is outside manufacturer tolerances and/or specifications or the wheels veering or leading to one side as opposed to the center line. For instance, more positive caster causes the wheels to self-align (e.g., return to center after a turn) faster than wheels with no or negative caster.

Process 400 includes presenting (at 416) the user interface with visual representations for the generated (at 412) measurements and/or the detected (at 414) alignment issues. For instance, the visual representations may include presenting an actual image of a wheel and an augmented reality overlay that illustrates an outline or wireframe of the wheel that is aligned according to the manufacturer specifications. The outline or wireframe may be presented at an offset angle or position relative to the actual wheel to illustrate one or more of the toe, camber, or caster misalignment. In some embodiments, the visual representations graphically illustrate the measured angles, positions, and/or rotations of the wheels and the angles, positions, and/or rotations according to the manufacturer tolerances and/or specification. In some embodiments, the visual representations may textually or graphically illustrate a detected parameter that is misaligned (e.g., toe, camber, caster, etc.), and the amount of misalignment measured for that parameter. For instance, the user interface may identify the measured toe angle of a particular wheel or tire, the manufacturer specified toe angle for that particular wheel or tire, and/or the amount by which the toe angle for that particular wheel or tire should be adjusted to return to be within the manufacturer specified toe angle.

Process 400 includes updating (at 418) the user interface according to adjustments that are made by the user and that are detected by sensor packages 100. Specifically, sensor packages 100 continually monitor and/or measure positioning, angles, rotations, and/or properties of the wheels, and therefore detect adjustments made by the user that change any of the measured properties (e.g., toe, camber, caster, etc.). Updating (at 418) the user interfaces includes providing real-time updates as to the wheel positions and angles or deviations from the manufacturer tolerances and/or specifications, and notifications once each wheel is aligned according to the manufacturer tolerances and/or specifications for that wheel. For instance, the mechanic or user may reference the user interface to properly align the wheels. Sensor packages 100 may continually measure the angle and/or position of each wheel relative to the other wheels and/or to manufacturer tolerances and/or specifications. As the user adjusts one of the wheels (e.g., adjusts the toe, camber, caster, etc.), sensor packages 100 may detect the corresponding change to the wheel angle or position, and controller 300 may update (at 418) the user interface to identify the changes in real-time and/or notify the user once specific wheel parameters or all wheel parameters are aligned according to the configured (at 402) manufacturer tolerances and/or specifications.

In some embodiments, the user interface may provide specific instructions on the repairs or adjustments that are needed to corrected the detected (at 414) alignment issues. In some such embodiments, controller 300 may identify the location of specific parts or hardware components (e.g., suspension component bolts, control arms, struts, steering arm or tie rod, caster bushing, etc.) of the vehicle for adjustment, and may graphically or textually provide the exact adjustment for the user to perform on that part. For instance, controller 300 may be configured with a digital rendering or mockup of the vehicle, and may highlight or otherwise indicate the location and/or shape of each part that requires adjustment, and may present instructions for loosening, tightening, repositioning, reorienting, and/or other adjustments to apply to that part.

In some embodiments, controller 300 may generate an augmented reality view of the vehicle that identifies the hardware components that need adjustment directly on actual images of the vehicle. For instance, the user device (e.g., an augmented reality headset or tablet device) may include one or more cameras that capture images of the vehicle. Controller 300 may receive the images, analyze the images to determine if parts affecting a detected misalignment issue are within the field-of-view of the images, detect movements from the current set of images that place the parts requiring adjustment into the field-of-view, identify the parts in the images that require adjustment, and visually differentiate or otherwise identify the parts requiring adjustment and the adjustment to make to those parts.

Figure 7:
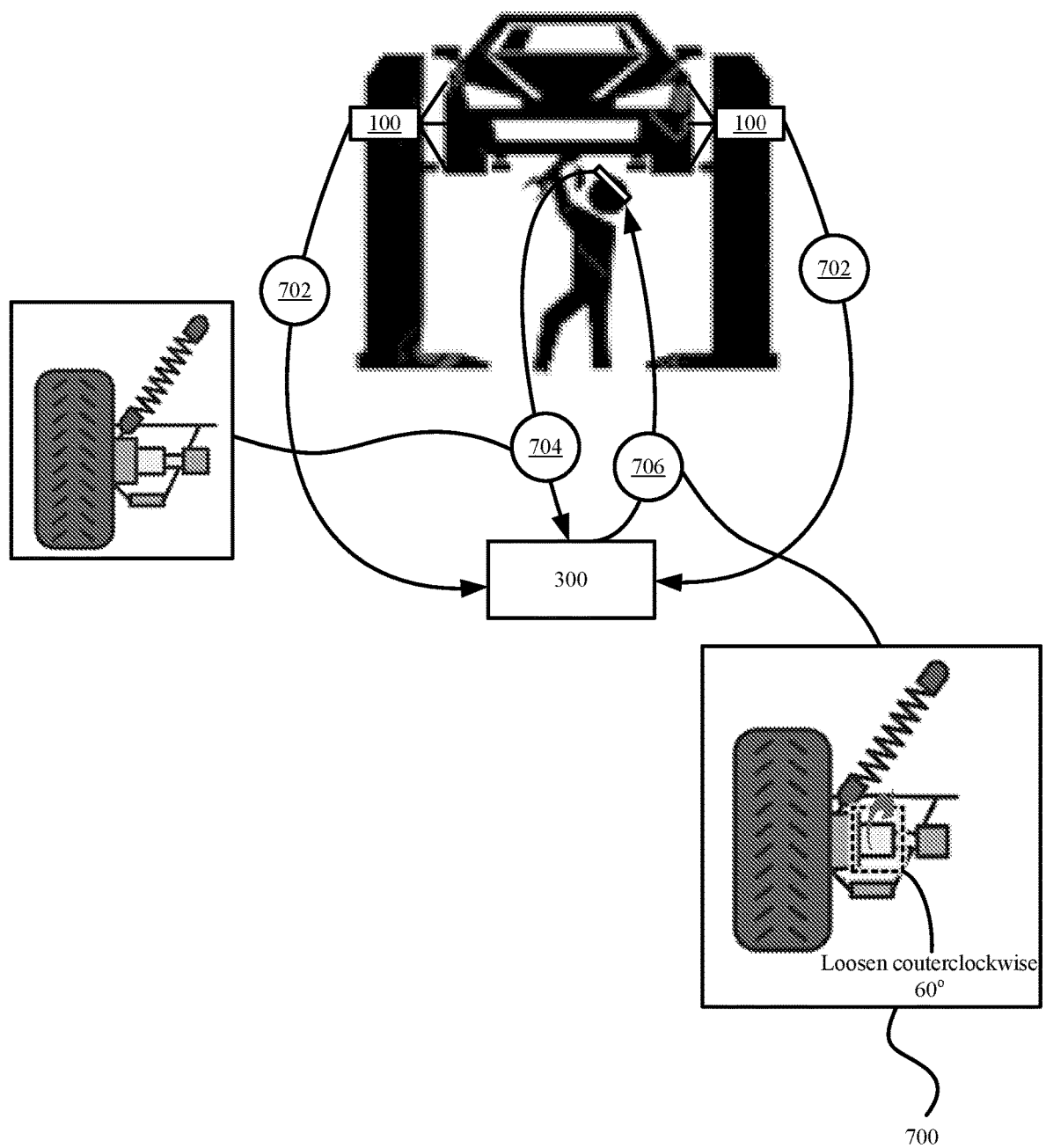
FIG. 7 illustrates an example user interface for controlling the adjustment of a misaligned vehicle component in accordance with some embodiments presented herein.

FIG. 7 illustrates an example user interface 700 for controlling the adjustment of a misaligned vehicle component in accordance with some embodiments presented herein. Controller 300 receives (at 702) measurements from sensor packages 100 mounted to the vehicle wheels, and determines an alignment issue with the front right wheel based on the received (at 702) measurements. Controller 300 also receives (at 704) an image for the field-of-view captured by a user device camera. The user device camera may be integrated in a headset (e.g., VR/MR/AR headset) worn by a mechanic or may be integrated in a portable electronic device (e.g., smartphone, tablet, etc.) that the mechanic uses to assist in locating parts for adjustment.

In some embodiments, controller 300 may compare the image to a digital representation or model of the vehicle in order to determine the exact vehicle location that is in the field-of-view. Controller 300 references the digital representation or model of the vehicle to determine the location of a specific part that may be adjusted in order to correct the detected alignment issue with the front right wheel, and to define movements that guide the user to the specific part and that bring the specific part into the camera field-of-view. In some embodiments, controller 300 is configured with different adjustments for different vehicle parts that correct various alignment issues. Controller 300 updates the user interface to present the defined movements to locate the specific part for adjustment. In some embodiments, controller 300 may update the user interface by creating an augmented reality view that identifies the location of the specific part even if it is obscured or behind other parts or is otherwise not in the field-of-view.

Controller 300 generates (at 706) user interface 700 to present the specific part for adjustment on the display of the user device. For instance, user interface 700 may highlight or otherwise visually differentiate the specific part that requires adjustment from other parts appearing in the received (at 704) image or the current field-of-view. Alternatively, user interface 700 may present a digital representation or previously captured image of the specific part and other surrounding part. User interface 700 also graphically, textually, or using audio presents the adjustments that tune, repair, or otherwise reconfigure the specific part to correct the detected alignment issue at the front right wheel. The adjustments may include instructions to tighten or loosen bolts, reposition or reorient the specific part to match a defined position or orientation for the specific part, set a specific tension or value for the specific part, and/or adjust the specific part until measurements from sensor packages 100 are within manufactured defined tolerances and/or specifications.

In some embodiments, the tires may be removed from the wheel hubs. The user may mount sensor packages 100 directly to the wheel hubs, and controller 300 may provide user interfaces and/or augmented reality views for guiding the alignment of the wheel hubs based on data obtained from sensor packages 100. For instance, sensor packages 100 may include one or more cameras that image the wheel hub and the structural components linking the wheel hub to the vehicle frame. Controller 300 may analyze the images, and may generate an augmented reality view that visually identifies the parts in the images requiring adjustment and the adjustment for the identified parts that corrects for a detected issue.

Sensor packages 100 continually measure different properties of each wheel before, after, and while adjustments are made to the wheel components. Sensor packages 100 monitor the adjustments performed by the user to determine if the adjustments correct any identified issues and/or to confirm once the tuning or repairs are complete and have set the adjusted parts or the vehicle characteristics affected by those parts to be within manufacturer defined tolerances and/or specifications. Controller 300 updates the user interface based on the updated measurements to notify the user if additional adjustments are needed or if the part has been properly tuned or repaired.

Sensor packages 100 and controller 300 of the vehicle tuning and calibration system may also assist with the exact positioning and orienting of targets for calibration of ADAS and other driver assist systems and features. Vehicle driver assist systems use one or more radars, cameras, LiDAR, Sound Navigation and Ranging ("SoNAR"), and/or other sensors placed across the vehicle body to control different driver assist features including autonomous driving, lane keeping, adaptive cruise control, and emergency braking. One or more of the sensors may be replaced, repaired, shift out of position, and/or reset, and may therefore require recalibration in order to function properly. For instance, a collision may cause one or more sensors to move out of position. If the sensors are not calibrated correctly, the vehicle driver assist features may malfunction or operate incorrectly causing the vehicle to not stay within the middle of a lane, maintain unsafe distances or speeds, and/or brake unexpectedly because objects are incorrectly detected by the sensors. The ADAS and other driver assist systems and features require correctly placed and oriented targets for proper system calibration. Each system and/or system manufacturer specifies different locations and orientations for the targets based on placement of the sensors on the vehicle and the tolerances of that sensor.

Without the vehicle tuning and calibration system, a user may manually locate and orient the targets based on measurements taken by the user and approximations made by the user as to the target orientation. The vehicle tuning and calibration system uses sensor packages 100 to determine the exact positions for the targets, and presents the AR enhanced interfaces to identify those positions and the exact orientation for the targets at those positions to remove the guess work and potential for user error from the positioning and orienting of the target. Moreover, the vehicle tuning and calibration system may use measurements from sensor packages 100 to verify that the placement and orientation for each of the targets matches the manufacturer specified location and orientation.

Figure 8:
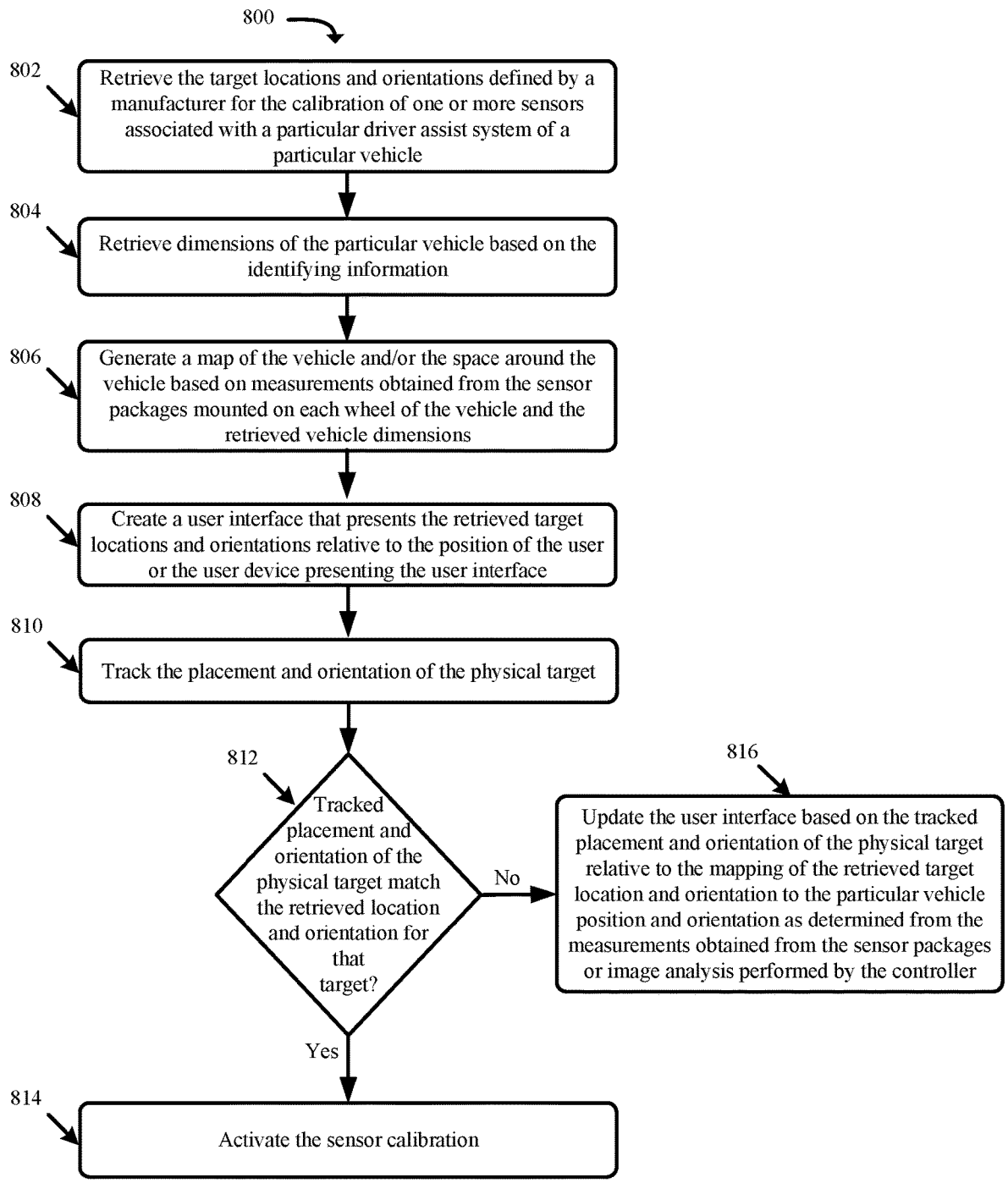
FIG. 8 presents a process for the exact placement and orientation of targets for vehicle sensor calibration in accordance with some embodiments presented herein.

FIG. 8 presents a process 800 for the exact placement and orientation of targets for vehicle sensor calibration in accordance with some embodiments presented herein. Process 800 is implemented using sensor packages 100 and controller 300 of the vehicle tuning and calibration system.

Process 800 includes retrieving (at 802) the target locations and orientations defined by a manufacturer for the calibration of one or more sensors associated with a particular driver assist system of a particular vehicle. A user may enter or scan the make and model of the particular vehicle, the VIN of the particular vehicle, the license plate of the particular vehicle, and/or other identifying information about the particular vehicle into the user interface that is generated by controller 300. Controller 300 queries one or more databases that contain the manufacturer calibration guidelines and/or specifications (e.g., target locations and orientations for calibrating different driver assist systems of different vehicles) using the particular vehicle identifying information, and retrieves (at 802) the target locations and orientations in response to the queries.

Process 800 includes retrieving (at 804) dimensions of the particular vehicle based on the identifying information. For instance, the dimensions may specify distances between the front wheels and the front of the particular vehicle, the rear wheels and the back of the particular vehicle, and between other features and the front and rear wheels. In some embodiments, the controller 300 retrieves a digital representation or model of the particular vehicle that includes the vehicle's dimensions.

Process 800 includes generating (at 806) a map of the vehicle and/or the space around the vehicle based on measurements obtained from sensor packages 100 mounted on each wheel of the vehicle and the retrieved (at 804) vehicle dimensions. Sensor packages 100 may use an acoustic range finder or other sensors from sensory array 205 to measure their height off the ground surface. Controller 300 receives the height measurements to determine the plane and/or level of the ground surface on which the vehicle is placed. Sensor packages 100 may also use UWB signaling to determine the positioning of each other sensor package 100 on the particular vehicle and to triangulate or otherwise locate any position in front, behind, or around the vehicle relative to the wheel positions. For instance, the center of the vehicle may correspond to the position at the middle of the position of each sensor package 100, and a position that is 3 feet in front of the vehicle and 2 feet off the ground may be determined from the measured height of each sensor package 100, the position of each front wheel sensor package 100, and the distance between the front wheel positions and the vehicle front as specified in the retrieved (at 804) vehicle dimensions.

Process 800 includes creating (at 808) a user interface that presents the retrieved (at 802) target locations and orientations relative to the position of the user or the user device presenting the user interface. In some embodiments, creating (at 808) the user interface includes presenting the target locations and orientations in an AR enhanced view. For instance, controller 300 computes the exact position and orientation for each target relative to the particular vehicle and/or positions and orientations measured using sensor packages 100 attached to the particular vehicle wheels. Controller 300 then receives one or more images captured by the user device camera. The one or more images represent the field-of-view before the user (e.g., a camera integrated as part of an AR/VR/MR headset worn by the user) or before the user device being carried by the user. Controller 300 analyzes the field-of-view to determine the positioning and orientation of the particular vehicle, and enhances the field-of-view in the one or more images by mapping the computed position and orientation for each target to the field-of-view, and by presenting visual markers or other visual identifiers for the placement and orientation of the targets relative to the identified position and orientation of the particular vehicle in the field-of-view. In some other embodiments, creating (at 808) the user interface includes tracking the positioning of the user device relative to each sensor package 100 and/or the particular vehicle based on UWB signaling that the user device receives from each sensor package 100. Controller 300 then enhances the display of the user device by presenting the visual markers or other visual identifiers at offset positions and orientations that are determined from the difference between the position and orientation of the user device relative to the particular vehicle and the computed position and orientation for each target relative to the particular vehicle and/or positions and orientations of sensor packages 100.

Figure 9:
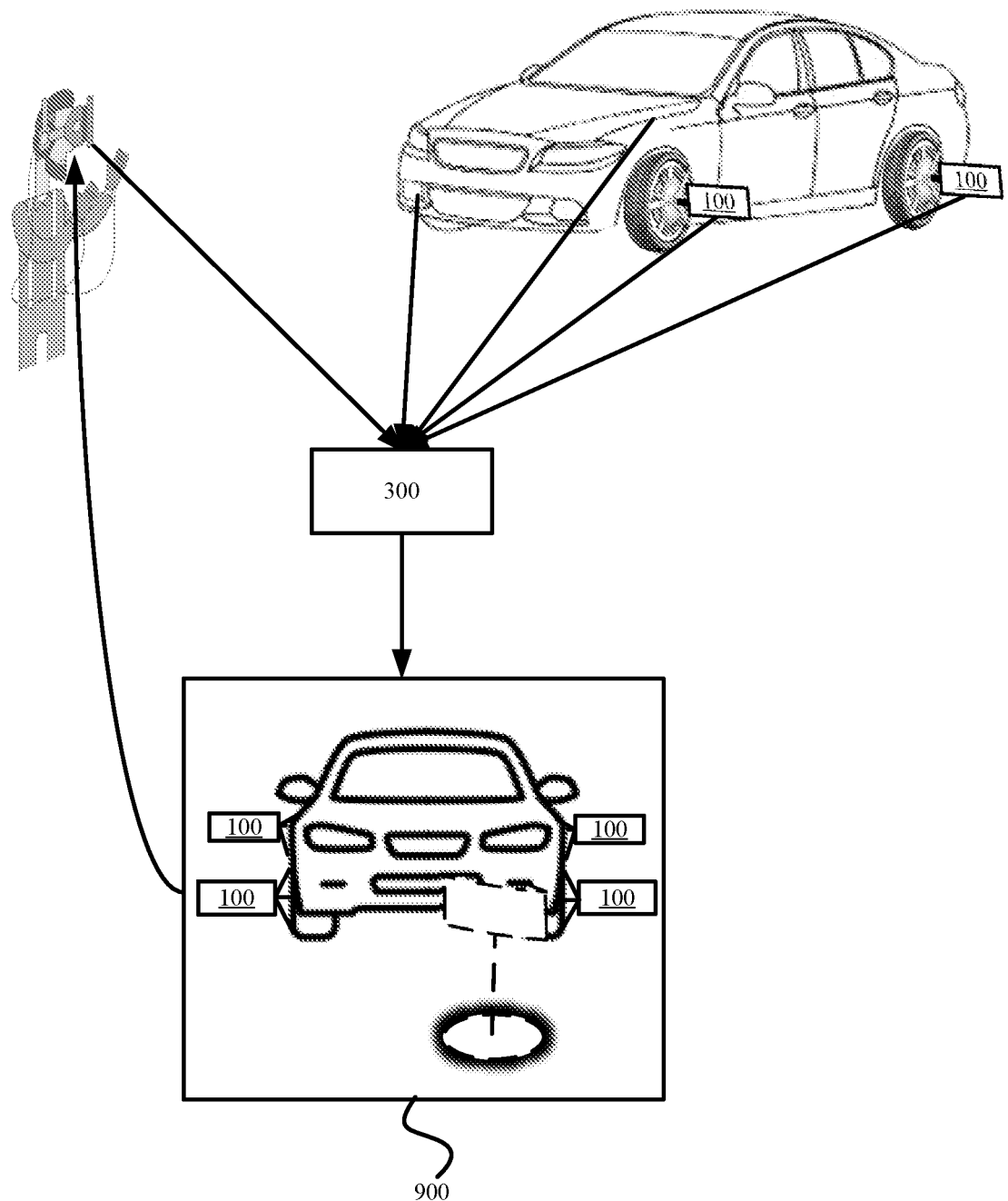
FIG. 9 illustrates an example augmented reality enhanced user interface for identifying the location and orientation of a target in accordance with some embodiments presented herein.

FIG. 9 illustrates an example AR enhanced user interface 900 for identifying the location and orientation of a target in accordance with some embodiments presented herein. AR enhanced user interface 900 is generated by controller 300 and is presented on a display of a user device. AR enhanced user interface 900 presents images of a current field-of-view and an overlaid graphical element that shows the placement and orientation of the target relative to the position and orientation of the particular vehicle in the current field-of-view.

Process 800 includes tracking (at 810) the placement and orientation of the physical target. The target may be a specifically shaped object (e.g., concave, rounded, triangular, etc.) made of metal, plastic, or other materials that reflect the light, sound, or other signals emitted from a particular vehicle sensor or that contain a pattern or image that is used for sensor calibration. In some embodiments, a UWB chip may be attached on the target such that sensor packages 100 and/or controller 300 may track (at 810) the exact position and orientation of the target relative to the positions and orientations of each sensor package 100, the particular vehicle, or the mapped 3D space around the particular vehicle. In some other embodiments, controller 300 may perform object recognition to track (at 810) the placement and orientation of the physical target in images captured by the user device. For instance, controller 300 identifies the shape or form of the target in the AR enhanced user interface and compares the shape or form of the target to the shape and form of the visual identifiers or markers for the specified position and orientation of the target.

Process 800 includes determining (at 812) whether the placement and orientation of the physical target match the retrieved (at 802) placement and orientation that is specified for that target by the manufacturer. The determination (at 812) is based on the tracking (at 810) of the physical target using sensor packages 100 and/or image analysis performed by controller 300.

In response to determining (at 812—Yes) that the placement and orientation of the physical target match the manufacturer specified position and orientation for the target, process 800 includes activating (at 814) the sensor calibration. Activating (at 814) the sensor calibration may include sending an activation message from controller 300 to the calibration module or system of the particular vehicle (e.g., the J2534 module or the Vehicle Communication Interface ("VCI") adapter). The activation message begins the calibration procedures of the particular vehicle for calibrating and/or verifying operation of the one or more sensors that rely on the correct positioning and orientation of the target. In some embodiments, controller 300 may activate (at 814) the sensor calibration once the position and orientation of all targets for sensors of a particular system are verified. Activating (at 814) the vehicle calibration may also include updating the user interface presented by controller 300 to notify the user that the targets have been correctly placed and orientated and/or that the calibration procedure has commenced. For instance, controller 300 may change the colors or highlight each target in the user interface that is properly aligned, and may provide status messages from the vehicle module or system while the calibration is ongoing.

In response to determining (at 812—No) that the placement and orientation of the physical target does not match the manufacturer specified position and orientation for the target, process 800 include updating (at 816) the user interface based on the tracked (at 810) placement and orientation of the physical target relative to the mapping of the retrieved (at 802) target location and orientation to the particular vehicle position and orientation as determined from the measurements obtained from sensor packages 100 or image analysis performed by controller 300. Updating (at 816) the user interface may include providing visual or audible queues or haptic feedback for the offsets between the tracked position and orientation of the physical target and the retrieved (at 802) target position and orientation and/or for moving the physical target to match the retrieved (at 802) target position and orientation. For instance, controller 300 may provide instructions for how to reposition or reorient the physical target in order for the target to be aligned with the manufacturer specified position and orientation, or may provide haptic feedback when the user aligns the target.

Figure 10:
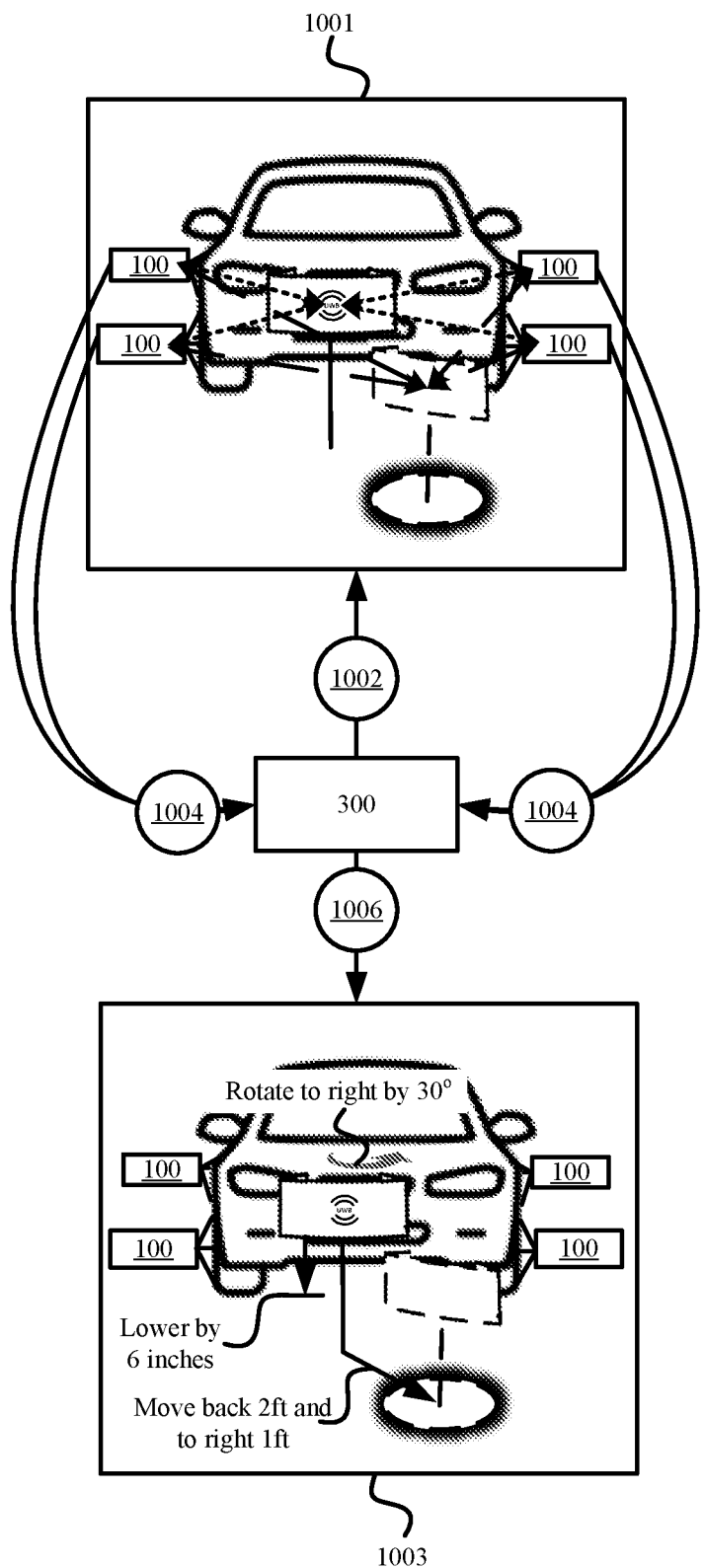
FIG. 10 illustrates an example of updating the user interface to guide the placement and orientation of a target for sensor calibration in accordance with some embodiments presented herein.

FIG. 10 illustrates an example of updating the user interface to guide the placement and orientation of a target for sensor calibration in accordance with some embodiments presented herein. Controller 300 generates (at 1002) an initial AR enhanced user interface 1001 that presents the actual imaged position and orientation of the physical target and an AR overlay that identifies the manufacturer specified positioning and orientation for the target in the images or field-of-view captured by the user device camera. Controller 300 generates (at 1002) the AR overlay for the target position and orientation by mapping the manufacturer specified positioning and orientation to the position and orientation of the vehicle as determined from the positional and orientation measurements generated by each sensor package 100.

Sensor packages 100 also measure the position and orientation of the physical target relative to the position and orientation of each sensor package 100 based on UWB signaling exchanged with the UWB chip on the physical target, or other distance and orientation measurements generated using radar, LiDAR, SoNAR, and/or other sensors in sensory array 205 of sensor packages 100. Controller 300 receives (at 1004) the detected position and orientation of the physical target from sensor packages 100, determines that the detected position and orientation of the physical target is offset from the manufacturer specified position and orientation for that target, and computes the offsets or the amounts by which the position and orientation of the physical target deviates from the manufacturer specified position and orientation. Controller 300 generates (at 1006) updated AR enhanced user interface 1003 to present visual or textual instructions for moving the physical target to resolve the offset between the detected position and orientation of the physical target and the manufacturer specified position and orientation for that target.

Figure 11:
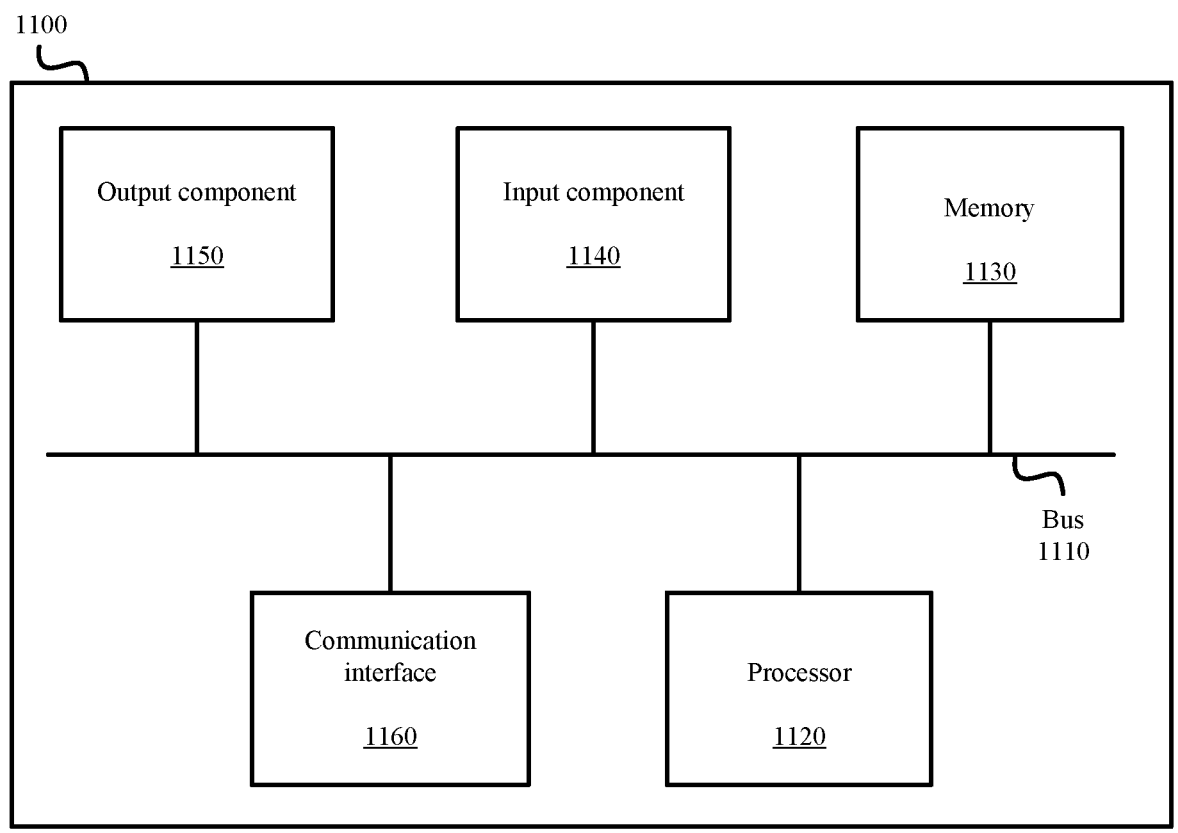
FIG. 11 illustrates example components of one or more devices, according to one or more embodiments described herein.

FIG. 11 is a diagram of example components of device 1100. Device 1100 may be used to implement one or more of the devices or systems described above (e.g., sensor package 100, controller 300, the user device with or without controller 300, etc.). Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A system comprising:
   a plurality of sensor packages, each sensor package of the plurality of sensor packages comprising:
   a connector with which to mount the sensor package to a wheel of a vehicle; and
   a sensory array comprising one or more sensors that generate a plurality of measurements for a positioning and movements of the wheel, wherein generating the plurality of measurements comprises:

synchronizing clocks of the plurality of sensor packages;

generating a first wheel measurement from wireless signaling that is exchanged between the sensory array of at least a first sensor package of the plurality of sensor packages that is mounted to a first wheel of the vehicle and the sensory array of at least a second sensor package of the plurality of sensor packages that is mounted to a second wheel of the vehicle;

generating a second wheel measurement based on a rotation of the first wheel tracked by the sensory array of the first sensor package; and generating different measurements with different sensor packages of the plurality of sensor packages at a same point in time, wherein generating the different measurements comprises:

associating a same timestamp to each of the different measurements as a result of synchronizing the clocks; and a controller comprising one or more hardware processors configured to:

receive the plurality of measurements that are generated by the sensory array of the plurality of sensor packages mounted to different wheels of the vehicle; and generate a user interface with one or more visual representations that are derived from the plurality of measurements.

2. The system of claim 1, wherein the one or more hardware processors are further configured to:

determine that the plurality of measurements generated by a particular sensor package mounted to a particular wheel of the vehicle deviate from one or more of a defined tolerance or specification for the particular wheel;

determine one or more components of the particular wheel that cause deviations in the plurality of measurements generated by the particular sensor package; and wherein generating the user interface comprises identifying the one or more components of the particular wheel in the user interface.

3. The system of claim 2, wherein identifying the one or more components comprises:

visually differentiating the one or more components from other components of the particular wheel in the user interface.

4. The system of claim 2, wherein the one or more hardware processors are further configured to:

determine adjustments to the one or more components that resolve the deviations in the plurality of measurements generated by the particular sensor package; and present the adjustments in the user interface.

5. The system of claim 1, wherein the one or more hardware processors are further configured to:

compare the plurality of measurements generated by each sensor package of the plurality of sensor packages;

determine that the plurality of measurements generated by a particular sensor package mounted to a particular wheel of the vehicle deviate from the plurality of measurements generated by other sensor packages of the plurality of sensor packages; and wherein generating the user interface comprises presenting the plurality of measurements generated by the particular sensor package in association with a visual representation of the particular wheel in the user interface.

6. The system of claim 1, wherein the one or more sensors of a particular sensor package comprise an Ultra-WideBand ("UWB") chip that measures distances between the particular sensor package and other sensor packages of the plurality of sensor packages.

7. The system of claim 1, wherein the one or more hardware processors are further configured to:

receive tolerances or specifications for proper alignment of wheels of the vehicle; and determine that a particular wheel of the vehicle is misaligned based on the plurality of measurements generated by a particular sensor package mounted to the particular wheel deviating from the tolerances or specifications for proper alignment of the particular wheel.

8. The system of claim 7, wherein generating the user interface comprises:

graphically illustrating in the user interface, a deviation between a measured position and orientation of the particular wheel and a position and orientation associated with a proper alignment of the particular wheel.

9. The system of claim 7, wherein generating the user interface comprises:

presenting one or more adjustments that align the particular wheel according to the tolerances and specifications for proper alignment of the particular wheel.

10. The system of claim 1 further comprising:

a user device with a display; and wherein the one or more hardware processors are further configured to:

present the user interface on the display of the user device.

11. A method comprising:

mounting a plurality of sensor packages to different wheels of a vehicle;

generating a plurality of measurements for a positioning and movements of each wheel of the different wheels using a sensory array of a sensor package from the plurality of sensor packages that is mounted to that wheel, wherein generating the plurality of measurements comprises:

synchronizing clocks of the plurality of sensor packages;

generating a first wheel measurement from wireless signaling that is exchanged between the sensory array of at least a first sensor package of the plurality of sensor packages that is mounted to a first wheel of the vehicle and the sensory array of at least a second sensor package of the plurality of sensor packages that is mounted to a second wheel of the vehicle;

generating a second wheel measurement based on a rotation of the first wheel tracked by the sensory array of the first sensor package; and generating different measurements with different sensor packages of the plurality of sensor packages at a same point in time, wherein generating the different measurements comprises:

associating a same timestamp to each of the different measurements as a result of synchronizing the clocks;

receiving the plurality of measurements that are generated by plurality of sensor packages at a controller; and generating, at the controller, a user interface with one or more visual representations that are derived from the plurality of measurements.

12. The method of claim 11 further comprising:
receiving a position and orientation for a target used in calibrating one or more sensors of the vehicle;
mapping the position and orientation for the target to an offset position and orientation from the plurality of sensor packages based on the measurements generated by the plurality of sensor packages; and
wherein generating the user interface comprises presenting a visual representation of the vehicle in the user interface and a visual indicator at the offset position and orientation.

13. The method of claim 11,
wherein receiving the plurality of measurements comprises:
receiving a first set of measurements generated by each sensor package of the plurality of sensor packages with a steering wheel of the vehicle fully rotated to a first direction; and
receiving a second set of measurements generated by each sensor package of the plurality of sensor packages with the steering wheel of the vehicle fully rotated to an opposite second direction; and
the method of claim 11 further comprising:
determining a center position of the steering wheel based on the first set of measurements and the second set of measurements; and
presenting a current position of the steering wheel relative to the center position based on a difference between a third set of measurements generated by each sensor package of the plurality of sensor packages at the current position of the steering wheel and the center position.

14. The system of claim 1, wherein generating the plurality of measurements further comprises:
calculating a positional offset between the first wheel and the second wheel based on the wireless signaling exchanged between the sensory arrays of the first and second sensor packages.

15. The system of claim 1, wherein the one or more hardware processors are further configured to:
detect an issue with one or more wheels of the vehicle based on a difference between the different measurements having the same timestamp.

16. The system of claim 1, wherein each sensor package of the plurality of sensor packages further comprises:
an indicator light, wherein the indicator light activates in response to the sensor package pairing with the controller.

17. A system comprising:
a plurality of sensor packages, each sensor package of the plurality of sensor packages comprising:
a connector with which to mount the sensor package to a wheel of a vehicle; and
a sensory array comprising one or more sensors that generate measurements for a positioning and movements of the wheel, wherein generating the measurements comprises:
generating a first wheel measurement from wireless signaling that is exchanged between the sensory array of at least a first sensor package of the plurality of sensor packages that is mounted to a first wheel of the vehicle and the sensory array of at least a second sensor package of the plurality of sensor packages that is mounted to a second wheel of the vehicle; and
generating a second wheel measurement based on a rotation of the first wheel tracked by the sensory array of the first sensor package; and
a controller comprising one or more hardware processors configured to:
receive the measurements that are generated by the sensory array of the plurality of sensor packages mounted to different wheels of the vehicle;
receive a position and orientation for a target used in calibrating one or more sensors of the vehicle;
map the position and orientation for the target to an offset position and orientation from the plurality of sensor packages based on the measurements generated by the plurality of sensor packages; and
generate a user interface with one or more visual representations that are derived from the measurements, and wherein generating the user interface comprises:
presenting a visual representation of the vehicle in the user interface and a visual indicator at the offset position and orientation.

18. A method comprising:
mounting a plurality of sensor packages to different wheels of a vehicle;
generating measurements for a positioning and movements of each wheel of the different wheels using a sensory array of a sensor package from the plurality of sensor packages that is mounted to that wheel, wherein generating the measurements comprises:
generating a first wheel measurement from wireless signaling that is exchanged between the sensory array of at least a first sensor package of the plurality of sensor packages that is mounted to a first wheel of the vehicle and the sensory array of at least a second sensor package of the plurality of sensor packages that is mounted to a second wheel of the vehicle; and
generating a second wheel measurement based on a rotation of the first wheel tracked by the sensory array of the first sensor package;
receiving the measurements that are generated by plurality of sensor packages at a controller;
receiving a position and orientation for a target used in calibrating one or more sensors of the vehicle;
mapping the position and orientation for the target to an offset position and orientation from the plurality of sensor packages based on the measurements generated by the plurality of sensor packages; and
generating, at the controller, a user interface with one or more visual representations that are derived from the measurements, and wherein generating the user interface comprises:
presenting a visual representation of the vehicle in the user interface and a visual indicator at the offset position and orientation.

19. A system comprising:
a plurality of sensor packages, each sensor package of the plurality of sensor packages comprising:
a connector with which to mount the sensor package to a wheel of a vehicle; and
a sensory array comprising one or more sensors that generate measurements for a positioning and movements of the wheel, wherein generating the measurements comprises:
generating a first wheel measurement from wireless signaling that is exchanged between the sensory array of at least a first sensor package of the plurality of sensor packages that is mounted to a first wheel of the vehicle and the sensory array of at least a second sensor package of the plurality of sensor packages that is mounted to a second wheel of the vehicle; and generating a second wheel measurement based on a rotation of the first wheel tracked by the sensory array of the first sensor package; and a controller comprising one or more hardware processors configured to:

receive the measurements that are generated by the sensory array of the plurality of sensor packages mounted to different wheels of the vehicle, wherein receiving the measurements comprises:

receiving a first set of measurements generated by each sensor package of the plurality of sensor packages with a steering wheel of the vehicle fully rotated to a first direction; and receiving a second set of measurements generated by each sensor package of the plurality of sensor packages with the steering wheel of the vehicle fully rotated to an opposite second direction;

determine a center position of the steering wheel based on the first set of measurements and the second set of measurements; and generate a user interface with one or more visual representations that are derived from the measurements, wherein generating the user interface comprises:

presenting a current position of the steering wheel relative to the center position based on a difference between a third set of measurements generated by each sensor package of the plurality of sensor packages at the current position of the steering wheel and the center position.

20. A method comprising:

mounting a plurality of sensor packages to different wheels of a vehicle;

generating measurements for a positioning and movements of each wheel of the different wheels using a sensory array of a sensor package from the plurality of sensor packages that is mounted to that wheel, wherein generating the measurements comprises:

generating a first wheel measurement from wireless signaling that is exchanged between the sensory array of at least a first sensor package of the plurality of sensor packages that is mounted to a first wheel of the vehicle and the sensory array of at least a second sensor package of the plurality of sensor packages that is mounted to a second wheel of the vehicle; and generating a second wheel measurement based on a rotation of the first wheel tracked by the sensory array of the first sensor package;

receiving the measurements that are generated by plurality of sensor packages at a controller wherein receiving the measurements comprises:

receiving a first set of measurements generated by each sensor package of the plurality of sensor packages with a steering wheel of the vehicle fully rotated to a first direction; and receiving a second set of measurements generated by each sensor package of the plurality of sensor packages with the steering wheel of the vehicle fully rotated to an opposite second direction;

determining a center position of the steering wheel based on the first set of measurements and the second set of measurements; and generating, at the controller, a user interface with one or more visual representations that are derived from the measurements, wherein generating the user interface comprises:

presenting a current position of the steering wheel relative to the center position based on a difference between a third set of measurements generated by each sensor package of the plurality of sensor packages at the current position of the steering wheel and the center position.

* * * * *